United States Patent
Dighe (10) Patent No.: US 11,795,057 B2
(45) Date of Patent: *Oct. 24, 2023

(54) SYSTEM AND METHOD FOR REMOVAL OF CARBON FROM CARBON DIOXIDE

(71) Applicant: Aquasource Technologies Corporation, North Huntingdon, PA (US)

(72) Inventor: Shyam Vasant Dighe, North Huntingdon, PA (US)

(73) Assignee: Aquasource Technologies Corporation, North Huntingdon, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/918,962

(22) PCT Filed: Mar. 31, 2022

(86) PCT No.: PCT/US2022/022769
§ 371 (c)(1),
(2) Date: Oct. 14, 2022

(87) PCT Pub. No.: WO2022/212663
PCT Pub. Date: Oct. 6, 2022

(65) Prior Publication Data
US 2023/0212016 A1    Jul. 6, 2023

Related U.S. Application Data

(63) Continuation-in-part of application No. 17/390,186, filed on Jul. 30, 2021, now Pat. No. 11,524,899.

(60) Provisional application No. 63/169,472, filed on Apr. 1, 2021.

(51) Int. Cl.
| | | |
|---|---|---|
| C01B 32/205 | (2017.01) | |
| B01J 6/00 | (2006.01) | |
| H05H 1/28 | (2006.01) | |
| B01J 12/00 | (2006.01) | |
| B01J 12/02 | (2006.01) | |
| B01J 19/08 | (2006.01) | |
| B01D 53/02 | (2006.01) | |

(52) U.S. Cl.
CPC ............. *C01B 32/205* (2017.08); *B01J 6/008* (2013.01); *B01J 12/002* (2013.01); *B01J 12/005* (2013.01); *B01J 12/02* (2013.01); *B01J 19/08* (2013.01); *B01J 19/088* (2013.01); *H05H 1/28* (2013.01); *B01D 53/02* (2013.01); *B01D 2256/16* (2013.01); *B01D 2257/702* (2013.01); *B01J 2219/0875* (2013.01); *B01J 2219/0883* (2013.01); *B01J 2219/0894* (2013.01); *B01J 2219/0898* (2013.01)

(58) Field of Classification Search
CPC .................................................. C01B 32/205
See application file for complete search history.

(56) References Cited

U.S. PATENT DOCUMENTS

| | | | |
|---|---|---|---|
| 5,767,165 A | 6/1998 | Steinberg et al. | |
| 6,773,689 B1 * | 8/2004 | Lynum ................. | C01B 3/0021 423/445 B |
| 7,097,822 B1 * | 8/2006 | Godal ...................... | C01B 3/24 423/450 |
| 2008/0156630 A1 | 7/2008 | Lee et al. | |
| 2015/0291433 A1 | 10/2015 | Kuhl | |

FOREIGN PATENT DOCUMENTS

| | | |
|---|---|---|
| JP | 2000344506 A | 12/2000 |
| WO | 9414899 | 7/1994 |

OTHER PUBLICATIONS

International Search Report for PC/US2022/022769 dated Jul. 28, 2022.
Written Opinion of the International Searching Authority for PC/US2022/022769 dated Jul. 28, 2022.

* cited by examiner

*Primary Examiner* — Stuart L Hendrickson
(74) *Attorney, Agent, or Firm* — Buchanan Ingersoll & Rooney PC (57) ABSTRACT

Disclosed is a system and method related to removal of carbon from carbon dioxide via the use of plasma arc heating techniques. The method involves generating C atoms and H atoms from $C_xH_y$. The method involves generating graphite and $H_2$ from the C atoms and H atoms, and extracting the graphite. The method involves quenching the $H_2$ with $C_xH_y$. The method involves receiving, at a generator, the quenched the $H_2$ and $C_xH_y$, and generating electricity. The method involves generating a concentrated stream of $H_2$ from the quenched $H_2$ and $C_xH_y$. The method involves receiving $CO_2$ and the concentrated stream of $H_2$ and generating C, O, and H atoms. The method involves receiving the C, O, and H atoms and generating graphite, wherein the graphite is extracted. In the hydrocarbon $C_xH_y$: x is an integer 1, 2, 3, . . . , and y=2x+2.

20 Claims, 5 Drawing Sheets

SYSTEM AND METHOD FOR REMOVAL OF CARBON FROM CARBON DIOXIDE

CROSS-REFERENCE TO RELATED APPLICATIONS

This patent application is the United States National Phase under 35 U.S.C. § 371 of PCT International Patent Application No. PCT/US2022/022769, filed Mar. 31, 2022, which claims the benefit of and priority to U.S. Provisional Patent Application No. 63/169,472, filed on Apr. 1, 2021, and U.S. Utility patent application Ser. No. 17/390,186, filed on Jul. 30, 2021, the entire contents of each are incorporated herein by reference in their entireties.

TECHNICAL FIELD

The present invention relates generally to treatment of greenhouse gases, specifically carbon dioxide, $CO_2$ which is converted to solid carbon, thereby preventing its release to atmosphere.

BACKGROUND

Global warming has been attributed to rise in greenhouse gases. The rise in the levels of carbon dioxide, $CO_2$ in atmosphere has been specifically identified by the scientific community, as the chief cause of temperature rise of Earth's atmosphere.

Conventional techniques for reducing the levels of $CO_2$ in atmosphere involve sequestration or capture of $CO_2$ and injecting the capture $CO_2$ below ground under impervious strata. Such techniques are expensive and temporary. The sequestered $CO_2$ has propensity to rise up to the surface due to fissures that are generated during earthquakes.

There is need for converting the captured $CO_2$ in to solid carbon such that it cannot reenter the atmosphere as greenhouse gas. The carbon when removed from $CO_2$ as solid, remains underground in the form it originally occurred before its removal from underground as fossil fuel, i.e., coal or natural gas. The current invention converts $CO_2$ in to solid carbon. The solid carbon is predominantly in the form of graphite which can be beneficially used in the economy. Graphite has several uses including as an adsorbent in filter media to remove pollutants from drinking water.

The present invention is directed toward overcoming one or more of the above-mentioned problems, though not necessarily limited to embodiments that do.

SUMMARY

The present invention can take numerous forms among which are those in which the $CO_2$ is treated in a chemical reactor and subject to high temperatures generated within the reactor by the use of a thermal plasma torch. The chemical reactor is also fed with hydrocarbon gas, e.g., natural gas or methane, $CH_4$ which generates the hydrogen, $H_2$ that is utilized to reduce the $CO_2$ to graphite.

The chemical reactions, i.e., generation of $H_2$ and reduction of $CO_2$, are carried out in different zones of the reactor.

In some instances, the different zones may be in separate but interconnected chemical reactors.

Particular apparatus for systems and processes in accordance with the present invention can be adapted from an apparatus that is presently currently available, but which has not been previously applied in the same manner. Just as examples, conventional chemical process called steam reforming is available to produce $H_2$ from $CH_4$. This conventional process uses steam $H_2O$, for converting $CH_4$ first to synthetic gas called syngas, i.e., a mixture of carbon monoxide (CO) and $H_2$. The syngas is then treated with additional steam, in another conventional reactor called a shift reactor, wherein CO is converted to $CO_2$ and $H_2$. The $H_2$ is then purified using conventional technologies, e.g., membrane and $CO_2$ adsorption.

The hydrocarbon gas used for generation of $H_2$ can be saturated hydrocarbons in the form of alkanes, $C_nH_{2n+2}$ where n=1, 2, 3, etc., where all bonds between carbon and hydrogen are single covalent bonds, e.g., methane $CH_4$, propane $C_2H_6$, etc. The hydrocarbon gas used for generation of $H_2$ can also be saturated hydrocarbons in the form of cycloalkanes, $C_nH_{(2n+2-2r)}$, where n=3, 4, 5, etc., and where 'r' is the total number of rings in the molecule, e.g., cyclopropane $C_3H_6$, cyclohexane $C_6H_{12}$. Additionally, the hydrocarbon gas used for generation of $H_2$ can also be unsaturated hydrocarbons in the form of alkenes, $C_nH_{2n}$ where n=2, 3, etc., e.g., ethylene $C_2H_4$, propylene $C_3H_6$, etc., or in the form of alkynes, $C_nH_{2n-2}$ where n=2, 3, etc., e.g., acetylene $C_2H_2$, etc., or aromatic hydrocarbons, e.g., benzene $C_6H_6$, etc.

In the exemplary case explained in the application below, the hydrocarbon gas is a saturated hydrocarbon in the form of alkane $C_nH_{2n+2}$ where n=1, viz. methane $CH_4$. One skilled in the art will appreciate that the present invention may be used to treat other hydrocarbons.

The present application presents examples of such systems and processes in which, in one or more successive chemical reaction stages, the graphite, C is produced by feeding $CH_4$ and $CO_2$ in reactor(s) heated by the plasma torch(es) to temperatures (e.g., to 5,000° C.) to carry out the overall chemical reaction as shown below.

$$CH_4 + CO_2 \leftrightarrow 2C + 2H_2O \tag{1}$$

Although this reaction is exothermic and releases approximately 103.71 kilo-Joules/mole, the reaction does not proceed as shown above due the reaction kinetics of many other parallel reactions involved. Some of the parallel reactions that can occur are shown below.

Most of these reactions are reversible and hence the direction of any one reaction depends on the chemical activity (concentration, temperature, and partial pressure) of species in the reaction zone.

$$\text{Oxidation } C + O_2 \leftrightarrow CO_2 \tag{2}$$

$$\text{Partial Oxidation } C + \tfrac{1}{2}O_2 \leftrightarrow CO \tag{3}$$

$$\text{Hydro-Gasification } C + H_2O \leftrightarrow CO + H_2 \tag{4}$$

$$\text{Boudouard } C + CO_2 \leftrightarrow 2CO \tag{5}$$

These are the main reactions but there are several others that are involved during the gasification process.

In this invention, the operating parameters of chemical reaction zones are adjusted such that certain reactions preferentially proceed in the manner required to deposit the carbon as graphite per forward reaction (1), without reacting with the steam produced during the forward hydro-gasification reaction (4) shown above.

The $H_2O$ water produced in this invention is available for use as drinking water. The graphite is available for various applications that do not convert it into greenhouse gas, e.g., filter media and other commercial uses.

In an exemplary embodiment, a system for removal of carbon from carbon dioxide includes a first stage and a second stage. The first stage includes a first stage primary plasma arc heater configured to receive $CH_4$ and generate C atoms and H atoms. The first stage includes a first stage pyrolysis reactor configured to receive the C atoms and H atoms from the first stage primary plasma arc heater and generate graphite and $H_2$, wherein the graphite exits the system. The first stage includes a first stage mixer configured to receive the $H_2$ from the first stage pyrolysis reactor and receive unreacted $CH_4$ and recycled heavier weight hydrocarbons, wherein the recycled heavier weight hydrocarbons quench the $H_2$ and the unreacted $CH_4$ to generate an outlet gas stream from the first stage mixer, the outlet gas stream comprising the quenched $H_2$, the quenched $CH_4$, and the recycled heavier weight hydrocarbons. The first stage include a first stage steam generator configured to receive the outlet gas stream from the first stage mixer and generate electricity, the electricity being transmitted to the first stage primary plasma arc heater. The first stage includes a first stage hydrogen separator configured to receive the outlet gas stream from the first stage steam generator and generate a concentrated stream of $H_2$ and a concentrated stream of heavier weight hydrocarbons. The second stage includes a second stage plasma arc heater configured to receive the concentrated stream of $H_2$ from the first stage hydrogen separator, recycled heavier weight hydrocarbons from water separator and receive $CO_2$ to generate C, O, and H atoms. The second stage includes a second stage $CO_2$ converter reactor configured to receive the C, O, and H atoms from the second stage plasma arc heater and generate graphite, and form a graphite stream and a steam $H_2O$ stream, wherein the graphite exits the system.

In some embodiments, the first stage plasma arc heater is configured to generate plasma gas within a range from 1,500° C. to 5,000° C.

In some embodiments, the first stage hydrogen separator is configured to generate a first concentrated stream of $CH_4$ and a second concentrated stream of heavier weight hydrocarbons. The first stage includes a first stage secondary plasma arc heater and the system is configured to direct the first concentrated stream of $CH_4$ to the first stage secondary plasma arc heater. The system is configured to direct the second concentrated stream of heavier weight hydrocarbons to the first stage primary plasma arc heater.

In some embodiments, the electricity generated by the first stage steam generator is transmitted to the first stage secondary plasma arc heater.

In some embodiments, the first stage secondary plasma arc heater is in connection with the first stage pyrolysis reactor. The system is configured to direct C atoms and H atoms from the first stage secondary plasma arc heater to the first stage pyrolysis reactor.

In some embodiments, the system includes a second stage mixer configured to receive any unreacted $CO_2$, any unreacted hydrogen $H_2$ from the second stage $CO_2$ converter reactor and receive recycled heavier weight hydrocarbons, wherein the recycled heavier weight hydrocarbons quenches the steam $H_2O$ stream, unreacted $CO_2$ and any unreacted hydrogen $H_2$ to generate a quenched stream.

In some embodiments, the system includes a second stage steam generator configured to receive the quenched stream from the second stage mixer and generate electricity, the electricity being transmitted to the second stage plasma arc heater.

In some embodiments, the second stage plasma arc heater is configured to generate plasma gas within a range from 1,500° C. to 5,000° C.

In some embodiments, the first stage hydrogen separator is configured to generate a concentrated stream of acetylene.

In an exemplary embodiment, a method for removal of carbon from carbon dioxide involves generating C atoms and H atoms from $CH_4$. The method involves generating graphite and $H_2$ from the C atoms and H atoms, and extracting the graphite. The method involves quenching the $H_2$ with $CH_4$ and heavier weight hydrocarbons. The method involves receiving, at a generator, the quenched the $H_2$, $CH_4$ and heavier weight hydrocarbons and generating electricity. The method involves generating a concentrated stream of $H_2$ from the quenched $H_2$, $CH_4$ and heavier weight hydrocarbons. The method involves receiving $CO_2$ and the concentrated stream of $H_2$ and generating C, O, and H atoms. The method involves receiving the C, O, and H atoms and generating graphite, wherein the graphite is extracted.

In an exemplary embodiment, a system for removal of carbon from carbon dioxide includes a first stage and a second stage. The first stage includes a first stage primary plasma arc heater configured to receive $C_xH_y$ and generate C atoms and H atoms. The first stage includes a first stage pyrolysis reactor configured to receive the C atoms and H atoms from the first stage primary plasma arc heater and generate graphite and $H_2$, wherein the graphite exits the system. The first stage includes a first stage mixer configured to receive the $H_2$ from the first stage pyrolysis reactor and receive unreacted $C_xH_y$ and recycled heavier weight hydrocarbons, wherein the recycled heavier weight hydrocarbons quench the $H_2$ and the unreacted $C_xH_y$ to generate an outlet gas stream from the first stage mixer, the outlet gas stream comprising the quenched $H_2$, the quenched $C_xH_y$, and the recycled heavier weight hydrocarbons. The first stage includes a first stage steam generator configured to receive the outlet gas stream from the first stage mixer and generate electricity, the electricity being transmitted to the first stage primary plasma arc heater. The first stage includes a first stage hydrogen separator configured to receive the outlet gas stream from the first stage steam generator and generate a concentrated stream of $H_2$ and a concentrated stream of heavier weight hydrocarbons. The a second stage includes a second stage plasma arc heater configured to receive the concentrated stream of $H_2$ from the first stage hydrogen separator, recycled heavier weight hydrocarbons from water separator and receive $CO_2$ to generate C, O, and H atoms. The a second stage includes a second stage $CO_2$ converter reactor configured to receive the C, O, and H atoms from the second stage plasma arc heater and generate graphite, and form a graphite stream and a steam $H_2O$ stream, wherein the graphite exits the system. In the hydrocarbon $C_xH_y$: x is an integer 1, 2, 3, . . . , and y=2x+2.

In some embodiments, the first stage plasma arc heater is configured to generate plasma gas within a range from 1,500° C. to 5,000° C.

In some embodiments, the first stage hydrogen separator is configured to generate a first concentrated stream of $C_xH_y$ and a second concentrated stream of heavier weight hydrocarbons. The first stage includes a first stage secondary plasma arc heater and the system is configured to direct the first concentrated stream of $C_xH_y$ to the first stage secondary plasma arc heater. The system is configured to direct the second concentrated stream of heavier weight hydrocarbons to the first stage plasma arc heater.

In some embodiments, the electricity generated by the first stage steam generator is transmitted to the first stage secondary plasma arc heater.

In some embodiments, the first stage secondary plasma arc heater is in connection with the first stage pyrolysis reactor. The system is configured to direct C atoms and H atoms from the first stage secondary plasma arc heater to the first stage pyrolysis reactor.

In some embodiments, the system includes a second stage mixer configured to receive any unreacted $CO_2$, any unreacted hydrogen $H_2$ from the second stage $CO_2$ converter reactor and receive recycled heavier weight hydrocarbons, wherein the heavier weight hydrocarbons quenches the steam $H_2O$ stream, unreacted $CO_2$ and any unreacted hydrogen $H_2$ to generate a quenched stream.

In some embodiments, the system includes a second stage generator configured to receive the quenched steam from the second stage mixer and generate electricity, the electricity being transmitted to the second stage plasma arc heater.

In some embodiments, the second stage plasma arc heater is configured to generate plasma gas within a range from 1,500° C. to 5,000° C.

In some embodiments, the first stage hydrogen separator is configured to generate a concentrated stream of acetylene.

In an exemplary embodiment, a method for removal of carbon from carbon dioxide involves generating C atoms and H atoms from $C_xH_y$. The method involves generating graphite and $H_2$ from the C atoms and H atoms, and extracting the graphite. The method involves quenching the $H_2$ with $C_xH_y$ and heavier weight hydrocarbons. The method involves receiving, at a generator, the quenched $H_2$, $C_xH_y$, and heavier weight hydrocarbons and generating electricity. The method involves generating a concentrated stream of $H_2$ from the quenched $H_2$, $C_xH_y$ and heavier weight hydrocarbons. The method involves receiving $CO_2$ and the concentrated stream of $H_2$ and generating C, O, and H atoms. The method involves receiving the C, O, and H atoms and generating graphite, wherein the graphite is extracted. In the hydrocarbon $C_xH_y$: x is an integer 1, 2, 3, ..., and y=2x+2.

In an exemplary embodiment, a system for removal of carbon from carbon dioxide includes a first stage. The first stage has a first stage primary plasma arc heater configured to receive $CH_4$ from a $CH_4$ source, the first stage primary plasma arc heater having an arc column that subjects the $CH_4$ to a temperature that breaks bonds between carbon and hydrogen to generate C atoms and H atoms. The first stage has a first stage pyrolysis reactor configured to receive the C and H atoms from the first stage plasma arc heater through an inlet designed to introduce the C and H atoms in a tangential flow direction to an axis of the pyrolysis reactor, which push the C atoms towards a wall of the first stage pyrolysis reactor away from H atoms, such that solid graphite is generated instead of carbon black along the wall of the first stage pyrolysis reactor from C atoms and $H_2$ gas is generated from H atoms along a center portion of the first stage pyrolysis reactor via $CH_4$ pyrolysis reaction $CH_4 \rightarrow C+2H_2$, wherein the wall of the first stage pyrolysis reactor is cooled by coolant flowing through an annular passage on an outside of the wall. The first stage has a first stage quench mixer configured to receive the $H_2$ and the unreacted $CH_4$ at a temperature t1 from the first stage pyrolysis reactor and receive a concentrated stream of heavier weight hydrocarbons at a temperature t2 from a first stage hydrogen separator. t2<t1. The first stage quench mixer has a mix chamber to mix the $H_2$, the unreacted $CH_4$, and the concentrated stream of heavier weight hydrocarbons and to allow the concentrated stream of heavier weight hydrocarbons to quench the $H_2$ and the unreacted $CH_4$ and form a quenched outlet gas stream comprising a mixture of $H_2$, unreacted $CH_4$, and recycled heavier weight hydrocarbons. The first stage has a first stage steam generator configured to receive the quenched outlet gas stream from the first stage quench mixer and generate an outlet gas stream and steam, the steam being fed to a steam turbine-generator to produce electricity, the electricity being transmitted to the first stage primary plasma arc heater. The first stage has a first stage hydrogen separator configured to receive the outlet gas stream from the first stage steam generator and generate a concentrated stream of $H_2$ and the concentrated stream of heavier weight hydrocarbons. The system includes a second stage. The second stage has a second stage plasma arc heater configured to receive the concentrated stream of $H_2$ from the first stage hydrogen separator, heavier weight hydrocarbons from a water separator, and $CO_2$ from a $CO_2$ source, the second stage primary plasma arc heater having an arc column that subjects the $H_2$, the heavier weight hydrocarbons, and the $CO_2$ to a temperature that breaks bonds between carbon, hydrogen, and oxygen to generate C, O, and H atoms. The second stage has a second stage $CO_2$ converter reactor configured to receive the C, O, and H atoms from the second stage plasma arc heater through an inlet designed to introduce the C, O, and H atoms in a tangential flow direction to an axis of the $CO_2$ converter reactor, which push the C atoms towards the wall of the $CO_2$ converter reactor away from the O and H atoms, such that solid graphite is generated instead of carbon black along a wall of the $CO_2$ converter reactor from C atoms and $H_2O$ gas is generated from H atoms and O atoms along a center of the $CO_2$ converter reactor due to preferential affinity O atoms to H atoms over C atoms in the graphite to generate a graphite stream and an $H_2O$ stream via $CO_2$ reduction reaction $CO_2+2H_2 \rightarrow C+2H_2O$, wherein the wall of the $CO_2$ converter reactor is cooled by coolant flowing through an annular passages on an outside of the wall.

In some embodiments, the first stage plasma arc heater is configured to generate plasma gas within a range from 1,500° C. to 5,000° C. so as to subject the $CH_4$ to temperatures within a range from 1,500° C. to 5,000° C.

In some embodiments, the first stage hydrogen separator is configured to generate a concentrated stream of $CH_4$ in addition to the concentrated stream of heavier weight hydrocarbons. The first stage includes a first stage secondary plasma arc heater, and the system is configured to direct the concentrated stream of $CH_4$ to the first stage secondary plasma arc heater. The system is configured to direct at least a portion of the concentrated stream of heavier weight hydrocarbons to the first stage primary plasma arc heater.

In some embodiments, the electricity generated by the first stage steam generator is also transmitted to the first stage secondary plasma arc heater.

In some embodiments, the first stage secondary plasma arc heater is in connection with the first stage pyrolysis reactor. The system is configured to direct C atoms and H atoms from the first stage secondary plasma arc heater to the first stage pyrolysis reactor.

In some embodiments, the system includes a second stage quench mixer configured to receive any unreacted $CO_2$ and any unreacted $H_2$ at a temperature t3 from the second stage $CO_2$ converter reactor, and receive heavier weight hydrocarbons at a temperature t4 from the water separator. t4<t3. The second stage quench mixing has a mix chamber to mix the unreacted $CO_2$, the unreacted hydrogen $H_2$, and the heavier weight hydrocarbons and to allow the heavier weight hydrocarbons to quench the unreacted $CO_2$ and the unreacted hydrogen $H_2$ to generate a quenched stream.

In some embodiments, the system includes a second stage steam generator configured to receive the quenched stream from the second stage mixer, generate steam from the quenched stream, the steam being fed to a steam turbine-generator to produce electricity, the electricity being transmitted to the second stage plasma arc heater.

In some embodiments, the second stage plasma arc heater is configured to generate plasma gas within a range from 1,500° C. to 5,000° C. so as to subject the $H_2$, the heavier weight hydrocarbons, and the $CO_2$ to temperatures within a range from 1,500° C. to 5,000° C.

In some embodiments, the first stage hydrogen separator is configured to generate a concentrated stream of acetylene in addition to the concentrated stream of $H_2$ and the concentrated stream of heavier weight hydrocarbons.

In an exemplary embodiment, a method for removal of carbon from carbon dioxide involves generating C atoms and H atoms from $CH_4$. The method involves generating graphite and $H_2$ from the C atoms and H atoms, and extracting the graphite. The method involves quenching the $H_2$ with $CH_4$ and heavier weight hydrocarbons. The method involves receiving, at a generator, the quenched the $H_2$, $CH_4$ and heavier weight hydrocarbons and generating electricity. The method involves generating a concentrated stream of $H_2$ from the quenched $H_2$, $CH_4$ and heavier weight hydrocarbons. The method involves receiving $CO_2$ and the concentrated stream of $H_2$ and generating C, O, and H atoms. The method involves receiving the C, O, and H atoms and generating graphite, wherein the graphite is extracted.

In an exemplary embodiment, a system for removal of carbon from carbon dioxide includes a first stage. The first stage has a first stage primary plasma arc heater configured to receive $C_xH_y$ from a $C_xH_y$ source, the first stage primary plasma arc heater having an arc column that subjects the $C_xH_y$ to a temperature that breaks bonds between carbon and hydrogen to generate C atoms and H atoms. The first stage has a first stage pyrolysis reactor configured to receive the C and H atoms from the first stage plasma arc heater through an inlet designed to introduce the C and H atoms in a tangential flow direction to an axis of the pyrolysis reactor, which push the C atoms towards a wall of the pyrolysis reactor away from H atoms, such that solid graphite is generated instead of carbon black along the wall of the first stage pyrolysis reactor from C atoms and $H_2$ gas is generated from H atoms along a center portion of the first stage pyrolysis reactor via $C_xH_y$ pyrolysis reaction $C_xH_y \rightarrow x\,C + y/2\,H_2$, wherein the wall of the pyrolysis reactor is cooled by coolant flowing through an annular passage on an outside of the wall. The first stage has a first stage quench mixer configured to receive the $H_2$ and the unreacted $C_xH_y$ at a temperature t1 from the first stage pyrolysis reactor and receive a concentrated stream of heavier weight hydrocarbons at a temperature t2 from a first stage hydrogen separator. t2<t1. The first stage has a first stage quench mixer has a mix chamber to mix the $H_2$, the unreacted $C_xH_y$, and the concentrated stream of heavier weight hydrocarbons and to allow the concentrated stream of heavier weight hydrocarbons to quench the $H_2$ and the unreacted $C_xH_y$ and form a quenched outlet gas stream comprising a mixture of $H_2$, unreacted $C_xH_y$, and recycled heavier weight hydrocarbons. The first stage has a first stage steam generator configured to receive the quenched outlet gas stream from the first stage quench mixer and generate an outlet gas stream and steam, the steam being fed to a steam turbine-generator to produce electricity, the electricity being transmitted to the first stage primary plasma arc heater. The first stage has a first stage hydrogen separator configured to receive the outlet gas stream from the first stage steam generator and generate a concentrated stream of $H_2$ and the concentrated stream of heavier weight hydrocarbons. The system includes a second stage. The second stage has a second stage plasma arc heater configured to receive the concentrated stream of $H_2$ from the first stage hydrogen separator, heavier weight hydrocarbons from a water separator, and $CO_2$ from a $CO_2$ source, the second stage primary plasma arc heater having an arc column that subjects the $H_2$, the heavier weight hydrocarbons, and the $CO_2$ to a temperature that breaks bonds between carbon, hydrogen, and oxygen to generate C, O, and H atoms. The second stage has a second stage $CO_2$ converter reactor configured to receive the C, O, and H atoms from the second stage plasma arc heater through an inlet designed to introduce the C, O, and H atoms in a tangential flow direction to an axis of the $CO_2$ converter reactor, which push the C atoms towards a wall of the $CO_2$ converter reactor away from the O and H atoms, such that solid graphite is generated instead of carbon black along the wall of the $CO_2$ converter reactor from C atoms and $H_2O$ gas is generated from H atoms and O atoms along a center of the $CO_2$ converter reactor due to preferential affinity O atoms to H atoms over C atoms in the graphite to generate a graphite stream and an $H_2O$ stream via $CO_2$ reduction reaction $CO_2 + 2H_2 \rightarrow C + 2H_2O$, wherein the wall of the $CO_2$ converter reactor is cooled by coolant flowing through an annular passages on an outside of the wall. In the hydrocarbon $C_xH_y$: x is an integer 1, 2, 3, . . . , and y=2x+2.

In some embodiments, the first stage plasma arc heater is configured to generate plasma gas within a range from 1,500° C. to 5,000° C. so as to subject the $C_xH_y$ to temperatures within a range from 1,500° C. to 5,000° C.

In some embodiments, the first stage hydrogen separator is configured to generate a concentrated stream of $C_xH_y$ in addition to the concentrated stream of heavier weight hydrocarbons. The first stage includes a first stage secondary plasma arc heater, and the system is configured to direct the concentrated stream of $C_xH_y$ to the first stage secondary plasma arc heater. The system is configured to direct at least a portion of the concentrated stream of heavier weight hydrocarbons to the first stage plasma arc heater.

In some embodiments, the electricity generated by the first stage steam generator is also transmitted to the first stage secondary plasma arc heater.

In some embodiments, the first stage secondary plasma arc heater is in connection with the first stage pyrolysis reactor. The system is configured to direct C atoms and H atoms from the first stage secondary plasma arc heater to the first stage pyrolysis reactor.

In some embodiments, the system includes a second stage quench mixer configured to receive any unreacted $CO_2$ and any unreacted $H_2$ at a temperature t3 from the second stage $CO_2$ converter reactor, and receive heavier weight hydrocarbons at a temperature t4 from the water separator. t4<t3. The second stage quench mixer has a mix chamber to mix the unreacted $CO_2$, the unreacted hydrogen $H_2$, and the heavier weight hydrocarbons and to allow the heavier weight hydrocarbons to quench the unreacted $CO_2$ and the unreacted hydrogen $H_2$ to generate a quenched stream.

In some embodiments, the system includes a second stage generator configured to receive the quenched stream from the second stage mixer, generate steam from the quenched stream, the steam being fed to a steam turbine-generator to produce electricity, the electricity being transmitted to the second stage plasma arc heater.

In some embodiments, the second stage plasma arc heater is configured to generate plasma gas within a range from 1,500° C. to 5,000° C. so as to subject the $H_2$, the heavier weight hydrocarbons, and the $CO_2$ to temperatures within a range from 1,500° C. to 5,000° C.

In some embodiments, the first stage hydrogen separator is configured to generate a concentrated stream of acetylene in addition to the concentrated stream of $H_2$ and the concentrated stream of heavier weight hydrocarbons.

In an exemplary embodiment, a method for removal of carbon from carbon dioxide involves generating C atoms and H atoms from $C_xH_y$. The method involves generating graphite and $H_2$ from the C atoms and H atoms, and extracting the graphite. The method involves quenching the $H_2$ with $C_xH_y$ and heavier weight hydrocarbons. The method involves receiving, at a generator, the quenched $H_2$, $C_xH_y$, and heavier weight hydrocarbons and generating electricity. The method involves generating a concentrated stream of $H_2$ from the quenched $H_2$, $C_xH_y$, and heavier weight hydrocarbons. The method involves receiving $CO_2$ and the concentrated stream of $H_2$ and generating C, O, and H atoms. The method involves receiving the C, O, and H atoms and generating graphite, wherein the graphite is extracted. In the hydrocarbon $C_xH_y$: x is an integer 1, 2, 3, . . . , and y=2x+2.

Further features, aspects, objects, advantages, possible applications, explanations and examples of the present invention are presented in the following sections and will become apparent from and study of the exemplary embodiments and examples described below, in combination with the Figures and the appended claims.

DETAILED DESCRIPTION

Figure 1:
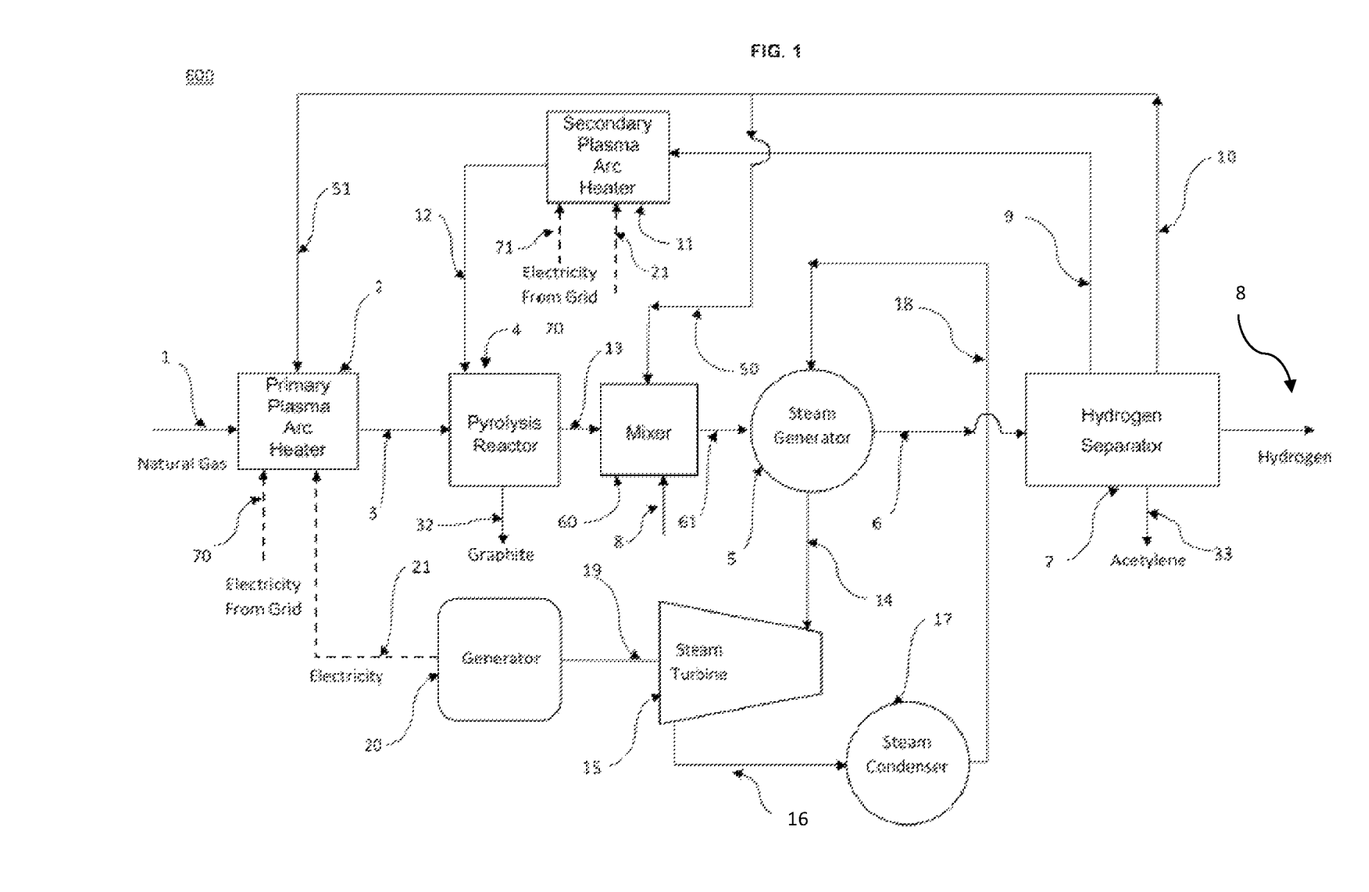
FIGS. 1 and 2 are schematic flow diagrams of particular examples of stages of a treatment system.
Figure 2:
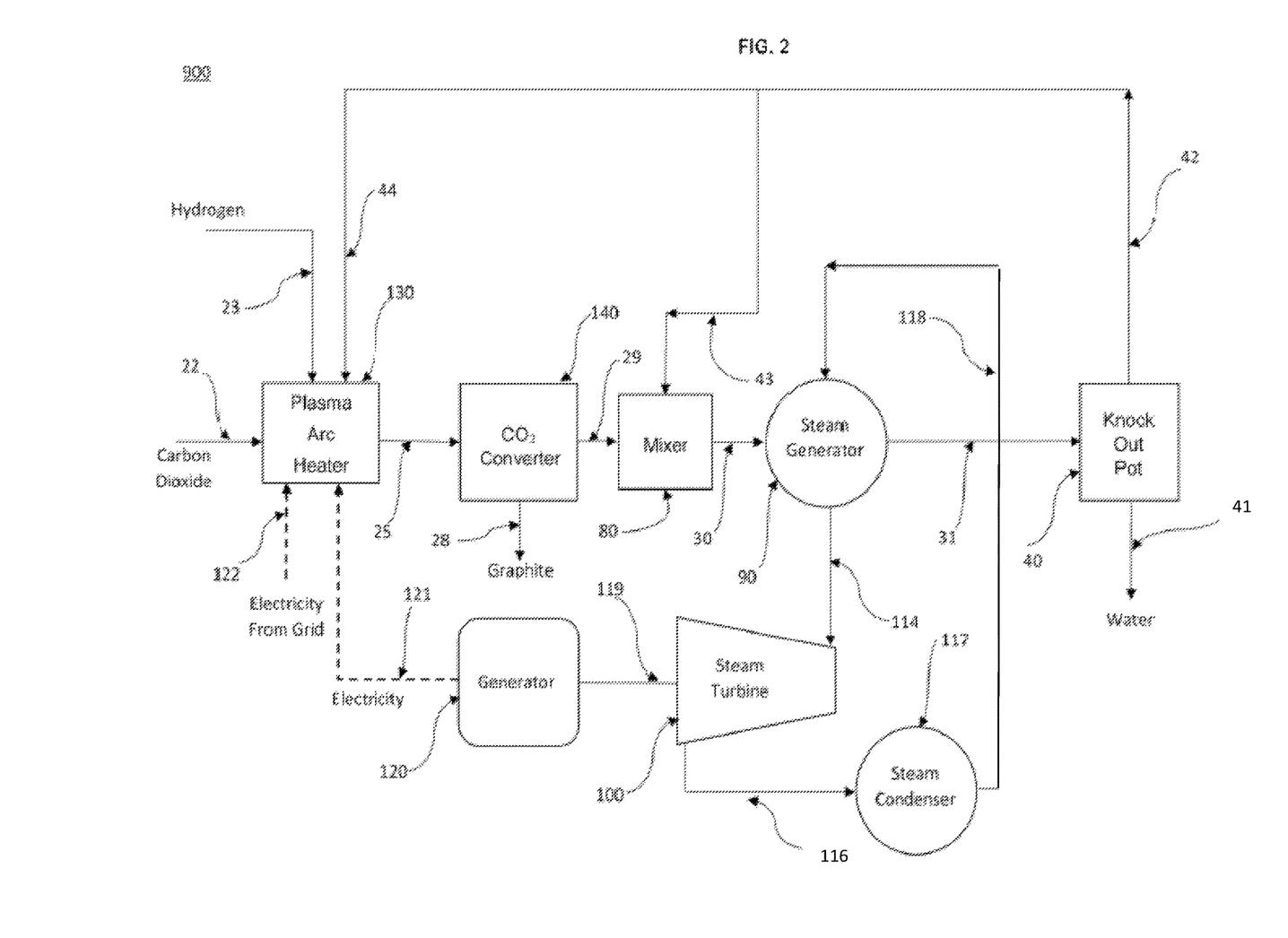
Figure 3:
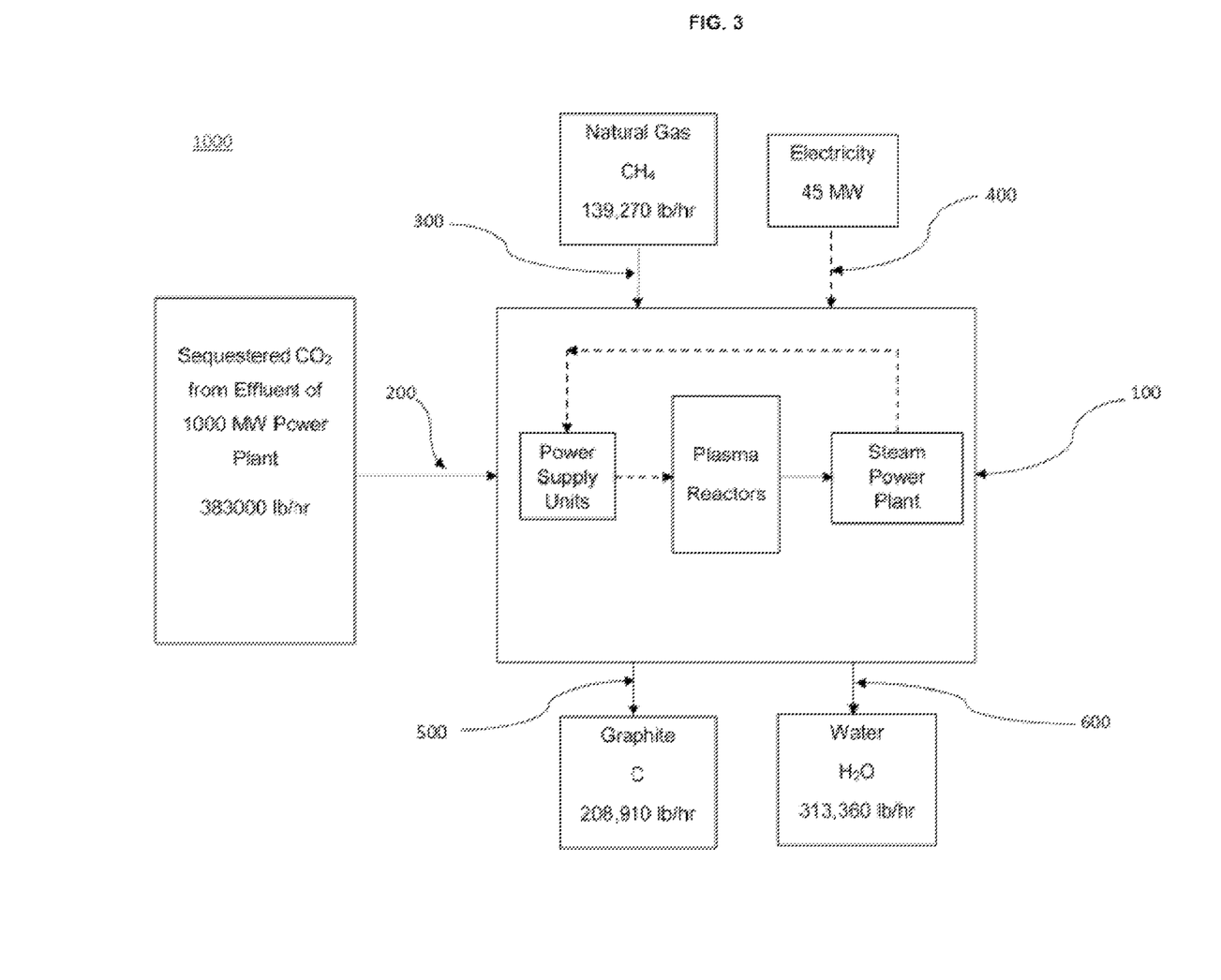
FIG. 3 is a schematic flow diagram of an example plasma reactor for converting $CO_2$ from power plant emissions to graphite, in conjunction with elements such as those of FIGS. 1-2.

FIGS. 1, 2 and 3 will be individually discussed but first their relation to each other in an example multi-step reactor system will be described.

It will be seen in FIGS. 1, 2 and 3 that carbon dioxide $CO_2$ can be converted to graphite and water by using natural gas $CH_4$. It will also be appreciated how an abundantly available fossil fuel can be beneficially utilized without adding greenhouse gas to the Earth's atmosphere. The examples being presented are illustrative of systems that may be chosen not merely for good technical performance but also for reasons relating to economic factors, such as initial capital cost and operating cost, as well as convenience factors, such as space requirements and portability.

Each of the FIGS. 1-3, merely by way of further example and without limitation, may include legends including numerical values (all of which are merely representative approximations and are not necessarily exact technical values and/or calculations). Further these legends are not necessarily the only suitable values that represent the nature and characteristics of materials as applied to, affected by, and resulting from the operations of the example system. Not all such legends will be repeated in this text although all form a part of this disclosure and are believed understandable to persons of ordinary skill in thermal processes; such data are sometimes referred to as heat and material balances.

Referring to FIG. 1, it shows an exemplary first stage 800 of an exemplary carbon sequestration process. In this first stage 800, the main process activity is extraction of hydrogen, $H_2$ from natural gas, $CH_4$. The $CH_4$ at an inlet 1, is fed in to the primary plasma arc heater 2, also known as plasma torch. The primary plasma arc heater 2 is supplied with electricity from the grid at 70. Inside the plasma arc heater 2, the $CH_4$ is passed through an arc column whose temperature is above 5,000° C. At these temperatures, the bonds between carbon atoms and hydrogen atoms are broken. The mixture 3 of carbon atoms and $H_2$ atoms is fed in to pyrolysis reactor 4. In the pyrolysis reactor 4, these atoms combine to form predominantly $H_2$ and graphite molecules and to a lesser extent other molecules of heavier molecular weight hydrocarbons like acetylene $C_2H_2$, ethylene $C_2H_4$, etc. The graphite is removed from the pyrolysis reactor 4 at outlet 32. The hot gases at outlet 13 of the pyrolysis reactor 4 are first quenched by stream of recycled heavier molecular weight hydrocarbons at 50 in a gas mixer 60 and then are further cooled in a steam generator 5. The steam generator 5 can be series of heat exchangers that reduce the temperature of the hot gases at 61 to a temperature at outlet 6 which is suitable to enter hydrogen separator 7. The hydrogen separator 7 can be series of separators, each capable of removing a particular molecule or group of molecules as mentioned above. The hydrogen separator's 7 primary function is to remove a concentrated stream of $H_2$ from other heavier molecular weight gases generated in the pyrolysis reactor 4. A first series of separators of the hydrogen separator 7 separates $CH_4$ to form a concentrated stream of $CH_4$ at outlet stream 9. A second series of separators of the hydrogen separator 7 generates a stream 10 of all remaining heavier molecular weight hydrocarbon gases. The concentrated stream of $H_2$ exits the hydrogen separator 7 at outlet 8.

The concentrated stream of recycled heavier molecular weight hydrocarbons at 10 is split in to two streams. One stream of recycled heavier molecular weight hydrocarbons at 51 is recycled to the primary plasma arc heater 2 where it is cracked along with the $CH_4$ feed. The second stream of recycled heavier molecular weight hydrocarbons at 50 is used to quench the hot gas stream 13 exiting the pyrolysis reactor 4 in a gas mixer 60. The quenching results in rapid cooling of the hot gas to temperature level that can be handled by conventional components of steam generator system 5. The stream 9 containing $CH_4$ is recycled through a secondary plasma arc heater 11. The secondary plasma arc heater 11 is supplied with electricity from the grid at 71. Unlike the primary plasma arc heater 2, the secondary plasma arc heater 11 is operated with different parameters of arc power and energy density, which is needed to crack concentrated stream of $CH_4$. Inside the secondary plasma arc heater 11, the concentrated stream of $CH_4$ is passed through an arc column whose temperature is above 5,000° C. At these temperatures, the bonds between carbon atoms and hydrogen atoms are broken. The mixture 12 of carbon atoms and $H_2$ atoms is fed in to pyrolysis reactor 4.

One of the series of separators in the hydrogen separator 7 can be used to separate acetylene via feed 33, which is valuable fuel.

In addition, a portion of the $H_2$ at 8 can also be recycled to assist in quenching the hot gas stream 13 in the gas mixer 60.

The steam generator 5 includes conventional components of a steam generator system that is used to recover heat from the hot gas stream 61 and generate high pressure steam 14 for power generation in a steam turbine 15 which is connected directly at 19 to a generator 20 to produce electricity at 21. The low pressure steam at 16 is condensed to water by steam condenser 17 which is recirculated to the steam generator 5 at 18. This electricity 21 is used to operate the primary plasma arc heater 2 whereby the amount of electricity 70 needed from the utility grid system, is reduced.

In addition, a portion of electricity 21 can also be provided to secondary plasma arc heater 11 to reduce the amount electricity needed from the utility grid system.

Referring to FIG. 2, it shows an exemplary second stage 900 of the exemplary carbon sequestration process. In this second stage 900, the main process activity is conversion of $CO_2$ to graphite and water by use of hydrogen, $H_2$ generated from the natural gas, $CH_4$ in the first stage 800 described above. The $CO_2$ at an inlet 22, is fed in to the plasma arc heater 130 along with $H_2$ at inlet 23, which is generated from the natural gas, $CH_4$ in first stage. The $H_2$ entering at inlet 23 is the $H_2$ exiting the hydrogen separator 7 at outlet 8. Inside the plasma arc heater 130, a mixture of $H_2$ and $CO_2$ is passed through an arc column whose temperature is above 5,000° C. At these temperatures, the bonds between carbon, oxygen and hydrogen atoms are broken. The mixture 25 of carbon, oxygen and $H_2$ atoms is fed in to $CO_2$ converter reactor 140. In converter reactor 140, these atoms combine to form steam $H_2O$ and graphite molecules. The graphite is removed from the converter reactor 140 at outlet 28. The hot gases containing unreacted hydrogen $H_2$, unreacted $CO_2$ and steam $H_2O$ at outlet 29 are quenched by stream of recycled unreacted hydrogen $H_2$ and unreacted $CO_2$ at 43 in a gas mixer 80. The quenching results in rapid cooling of the hot gas to temperature level that can be handled by conventional components of steam generator system 90. The steam generator 90 can be series of heat exchangers that reduce the temperature of the hot gases at 30 to a temperature at outlet 31 which is suitable to condense the steam $H_2O$ into water $H_2O$ before entering water separator 40, also known conventionally as knock out pot 40. The knock out pot's 40 primary function is to separate unreacted hydrogen $H_2$ and unreacted $CO_2$ from steam generated in the $CO_2$ converter reactor 140. The water exits the water separator 40 at outlet 41.

The unreacted hydrogen $H_2$ and unreacted $CO_2$ stream at 42 is split in to two streams. One stream of unreacted hydrogen $H_2$ and unreacted $CO_2$ at 44 is recycled to the plasma arc heater 130 where it is reheated to be cracked along with the $CO_2$ feed at 22. The second stream of unreacted hydrogen $H_2$ and unreacted $CO_2$ at 43 is used to quench the hot gas stream 29 exiting the converter reactor 140 in a gas mixer 80. The quenching results is rapid cooling of the hot gas to a temperature level that can be handled by conventional components of steam generator system 90.

The steam generator 90 includes conventional components of a steam generator system that is used to recover heat from the hot gas stream 30 and generate high pressure steam 114 for power generation in a steam turbine 100 which is connected directly at 119 to a generator 120 to produce electricity at 121. This electricity 121 is used to operate the plasma arc heater 130 whereby the amount of electricity 122 needed from the utility grid system, is reduced. The low pressure steam at 116 is condensed to water by steam condenser 117 which is recirculated to the steam generator 90 at 118.

Referring to FIG. 3, it shows an exemplary system 1000 in which carbon dioxide $CO_2$ at inlet 200 which has been sequestered from the emissions of a 1000 MW power plant or similar system utilized to generate electricity from fossil fuels, is fed to the plant 100 utilizing systems and processes described in current invention. The $CO_2$ sequestration system is commercially available and is described in published literature and will not be described herein other than its known use to capture and concentrate $CO_2$ from power plant emissions. The natural gas $CH_4$ at inlet 300 and electricity from the utility grid at inlet 400 are the other input streams to the plant 100. The graphite at outlet 500 and water at outlet 600 are produced by the plant 100.

In an exemplary embodiment, the system includes a first stage 800 (FIG. 1) configured to generate a $H_2$ stream from a $CH_4$ stream. The generated $H_2$ stream is fed to a second stage 900 (FIG. 2), along with a $CO_2$ stream (e.g., a $CO_2$ stream that is sequestered from a power plant, for example). Both the first stage 800 and second stage 900 generate graphite as an output.

The first stage 800 includes a first stage primary plasma arc heater 2 in connection with a pyrolysis reactor 4 via feed 3. $CH_4$ is fed into the primary plasma arc heater 2 via feed line 1. Any of the plasma arc heaters disclosed herein can be a furnace configured to use plasma flow to transfer heat to a substance. Any of the plasma arc heaters disclosed herein can be configured to obtain electrical power from an electrical power grid or external electrical power source 70, as its main source of electrical power. The plasma flow can be generated via one or more plasma torches. Typically, the plasma torch includes housing, axial tubing, nozzle, electrodes, etc., for feeding a plasma-forming gas (e.g., air, nitrogen or argon). For cracking of $CH_4$, a non-transferred arc is used such that the arc produced during its operation stays inside the plasma torch. The $CH_4$ and other gases are fed in a manner so that a predominant amount of gases fed to the plasma torch are made to go through the plasma arc column in order to facilitate cracking of the gas molecules in to their constituent atoms. In the case of the primary plasma arc heater 2, heat is generated and transferred to $CH_4$ as the $CH_4$ passes through an arc column of the plasma arc heater 2. The $CH_4$, while passing through the arc column, is subjected to temperatures 5,000° C. or greater so that the bonds between carbon atoms and hydrogen atoms are broken. Typically, the energy density of the plasma arc column is in the range of 100-400 kilowatts for a flow of one kilogram of $CH_4$. Temperatures of 5,000° C. or greater are required to crack $CH_4$, and thus it is contemplated for the temperature within the arc column to be within a range from 5,000° C. to 10,000° C. This will require the primary plasma arc heater 2 to generate plasma gas within a range from 1,500° C. to 5,000° C. In a preferred embodiment, the primary plasma arc heater 2 generates plasma gas within a range from 3,000° C. to 5,000° C. The result is a mixture comprising C atoms and H atoms. This C atom and H atom mixture is fed to the pyrolysis reactor 4.

The pyrolysis reactor 4 can be a device configured to decompose organic material at elevated temperatures. This is typically done by subjecting the organic material to elevated temperature in an inert atmosphere (e.g., in the absence of an oxidizer). In this case, the a reaction vessel which is part of the pyrolysis reactor 4 maintains the C atom and H atom mixture to elevated temperatures in the range of 3,000° C. to 5,000° C. in the absence of oxygen for sufficient time in the range of 30-120 seconds. The pyrolysis causes C atoms to combine with C atoms to form graphite molecules, and H atoms to combine with H atoms to form $H_2$. The pyrolysis also forms other hydrocarbon molecules, such as acetylene $C_2H_2$, ethylene $C_2H_4$, etc. The mixture of graphite molecules, $H_2$, and other hydrocarbon molecules is fed to a chemical separator which is part of the pyrolysis reactor 4. Conventional chemical separation methods (e.g., vortex separator, gravity separator, etc.) can be used to separate the graphite molecules from the $H_2$ and other hydrocarbon molecules to produce a graphite stream. The graphite stream can be removed from the system at outlet 32, leaving a mixture of hot gasses (e.g., $H_2$ and other hydrocarbon molecules) in the system.

The pyrolysis reactor 4 is in connection with a first stage mixer 60 via feed 13. The mixture of hot gasses (e.g., $H_2$ and other hydrocarbon molecules) exists the pyrolysis reactor 4 and is directed via feed 13 to a first stage mixer 60. The hot gases at feed 13 are quenched from approximately 3,500° C. to 1,500° C. by a stream of recycled heavier molecular weight hydrocarbons 10 at 50 in the first stage mixer 60. The purpose of quenching the hot gases is to rapidly cool the hot gases to a temperature level that can be handled by conventional components of a steam generator 5. For instance, the mixer 60 can be configured as a quench mixer to effectively and efficiently mix the hot gases with the stream of recycled heavier molecular weight hydrocarbons using vortex cooling. This stream of recycled heavier molecular weight hydrocarbons at 50 comes from a downstream operation via a hydrogen separator 7, which will be discussed in detail later. The quenched hot gases and the recycled heavier molecular weight hydrocarbons exit the first stage mixer 60 and are fed into a steam generator 5 via feed 61—e.g., the first mixer 60 is in connection with a first steam generator 5 via inlet 61. The steam generator 5 includes a series of heat exchangers configured to reduce the temperature of the hot gases and recycled heavier molecular weight hydrocarbons to a temperature in the range of 100° C. to 300° C. at outlet 6 which is suitable to enter a hydrogen separator 7. The heat exchangers transfer heat from the hot gases and recycled heavier molecular weight hydrocarbons to water to generate steam, which is transferred via feed 14 to a steam turbine 15.

The first stage steam turbine 15 is in connection with a first stage steam condenser 17 via feed 16. The first stage steam condenser 17 is in connection with the first stage steam generator 5 via a feedback feed 18 so as to circulate the condensed/cooled water back to the first stage steam generator 5 for generating more steam when more heat is supplied to the steam generator 5. The first stage steam turbine 15 is also in connection with a first stage generator 20 at 19. For instance, the first stage steam turbine 15 can include a rotating turbine shaft that rotates due to the steam being supplied to it. The first stage generator 20 can be an electrical generator configured to generate electrical power from the rotating turbine shaft of the first stage steam turbine 15. The first stage generator 20 is in electrical connection with the first plasma arc heater 2 to supply electrical power thereto via connection 21. This electrical power can supplement electrical power being supplied to the first plasma arc heater 2 via an electrical power grid or external electrical power source 70. Typically, the steam generator system produces high pressure steam at pressures in the range of 100-500 atmospheres which is sent through the steam turbine generator combination system to produce electricity. The steam exiting the first stage steam turbine 15 is at low pressure in the range of few mm of Hg to few atmospheres depending on the design of the steam turbine. The electricity generated by the steam turbine generator set could be in the range of 10 MW to 500 MW.

The first stage steam generator 5 is also in connection with a hydrogen separator 7 via feed 6. The hot gases consisting of $H_2$, unreacted $CH_4$ and heavier molecular weight hydrocarbons from the first stage steam generator 5 are fed to the hydrogen separator 7 via feed 6, wherein the hydrogen separator 7 generates a $H_2$ stream to be fed into the second stage 900. Conventional chemical separation methods, e.g., molecular sieves, etc., can be used to separate out the $H_2$ gas from the unreacted $CH_4$ and recycled heavier molecular weight hydrocarbons stream to produce the $H_2$ stream that will be feed into the second stage 900. It is contemplated for the hydrogen separator 7 to include a series of separators, each separator capable of removing a particular molecule or group of molecules. For example, a first separator of the hydrogen separator 7 can separate unreacted $CH_4$ to form a concentrated stream of $CH_4$. This concentrated stream of $CH_4$ can be directed to outlet stream 9. A second separator of the hydrogen separator 7 can separate all remaining heavier molecular weight hydrocarbon gases to form stream 10. The gasses passing through the first (removing $CH_4$) and second (removing the heavier molecular weight hydrocarbon gases) separators leave a concentrated $H_2$ stream, which is directed to outlet 8 and into the second stage 900. It should be noted that more or less separators can be used for the hydrogen separator 7.

The hydrogen separator 7 is also in connection with the primary plasma arc heater 2 via feed 10, which will use the concentrated stream of recycled heavier molecular weight hydrocarbons 51 produced by the hydrogen separator 7—this concentrated stream of recycled heavier molecular weight hydrocarbons 51 is combined with the $CH_4$ being introduced into the primary plasma arc heater 2 via feed 1. It is contemplated for the $CH_4$ being introduced into the primary plasma arc heater 2 via feed 1 to enter the primary plasma arc heater 2 through a first port and be used generate plasma heat gas for the primary plasma arc heater 2. The recycled heavier molecular weight hydrocarbons 51 introduced into the primary plasma arc heater 2 via feed 10 enter the primary plasma arc heater 2 through a second port and are not used to generate plasma heat gas for the primary plasma arc heater 2. Feed 10 also has a connection to the first mixer 60 via feed 50, which will also use the concentrated stream of recycled heavier molecular weight hydrocarbons produced by the hydrogen separator 7 to quench the hot gases. The hydrogen separator 7 is also in connection with a secondary plasma arc heater 11 via feed 9, which will use recycled unreacted $CH_4$ of stream 9—the secondary plasma arc heater 11 will crack unreacted $CH_4$ to generate C atoms and $H_2$ atoms, which are fed into the pyrolysis reactor 4 along with the C atoms and $H_2$ atoms from the primary plasma arc heater 2. The recycled unreacted $CH_4$ of stream 9 is used to generate plasma heat gas for the secondary plasma arc heater 11. Again, temperatures of 5,000° C. or greater are required to crack $CH_4$, and thus it is contemplated for the temperature within the arc column to be within a range from 5,000° C. to 10,000° C. This will require the secondary plasma arc heater 11 to generate plasma gas within a range from 1,500° C. to 5,000° C. In a preferred embodiment, the secondary plasma arc heater 11 generates plasma gas within a range from 3,000° C. to 5,000° C.

An exemplary process for the first stage 800 is as follows. $CH_4$ is fed into a first stage primary plasma arc heater 2 via feed 1, wherein the $CH_4$ is subjected to a 5,000° C. environment via an arc column of the primary plasma arc heater 2. During this process, bonds between C atoms and H atoms are broken. A stream of C atoms and H atoms is fed in to pyrolysis reactor 4 via feed 3, wherein H atoms combine with H atoms and C atoms combine with C atoms to form predominantly $H_2$ and graphite molecules. Graphite is removed from the pyrolysis reactor 4 at outlet feed 32. Hot $H_2$ gas is fed into the first stage mixer 60 via feed 13. A stream of recycled heavier molecular weight hydrocarbons via feed 50 is introduced into the first stage mixer 60 to quench the $H_2$ gas at the first stage mixer 60. The quenched $H_2$ gas, quenched unreacted $CH_4$ and quenched recycled heavier molecular weight hydrocarbons gas are fed into a first stage steam generator 5 via feed 61, wherein the quenched $H_2$ gas, quenched unreacted $CH_4$ and quenched recycled heavier molecular weight hydrocarbons gas are further cooled. The cooling of the quenched $H_2$ gas, quenched unreacted $CH_4$ and quenched recycled heavier molecular weight hydrocarbons gas in the first stage steam generator 5, along with the first generator 20, is used to generate electricity. The electricity is transmitted to the primary plasma arc heater 2 via connection 21. The cooled $H_2$ gas, unreacted $CH_4$ and recycled heavier molecular weight hydrocarbons gas from the first steam generator 5 is fed to the hydrogen separator 7 via feed 6, wherein a concentrated stream of $H_2$ is removed from other heavier molecular weight gases generated in the pyrolysis reactor 4.

It is contemplated for the hydrogen separator 7 to include a series of separators, each separator capable of removing a particular molecule or group of molecules. For example, a first separator of the hydrogen separator 7 can separate unreacted $CH_4$ to form a concentrated stream of $CH_4$. This concentrated stream of $CH_4$ can be directed to outlet stream 9. A second separator of the hydrogen separator 7 can separate all remaining heavier molecular weight hydrocarbon gases to form stream 10. The gasses passing through the first (removing $CH_4$) and second (removing the heavier molecular weight hydrocarbon gases) separators leave a concentrated $H_2$ stream, which is directed to outlet 8 and into the second stage 900. It should be noted that more or less separators can be used for the hydrogen separator 7.

The hydrogen separator 7 is also in connection with the primary plasma arc heater 2 via feed 10, which will use the concentrated stream of recycled heavier molecular weight hydrocarbons produced by the hydrogen separator 7—this concentrated stream of recycled heavier molecular weight hydrocarbons is combined with the $CH_4$ being introduced into the primary plasma arc heater 2 via feed 1. Feed 10 also has a connection to the first mixer 60 via feed 50, which will also use the concentrated stream of recycled heavier molecular weight hydrocarbons produced by the hydrogen separator 7 to quench the hot gases. The hydrogen separator 7 is also in connection with a secondary plasma arc heater 11 via feed 9, which will use recycled unreacted $CH_4$ of stream 9—the secondary plasma arc heater 11 will crack unreacted $CH_4$ to generate C atoms and $H_2$ atoms, which are fed into the pyrolysis reactor 4 along with the C atoms and $H_2$ atoms from the primary plasma arc heater 2 via feed 12.

The second stage 900 includes a third plasma arc heater 130. The $H_2$ stream generated from the hydrogen separator 7 of the first stage 800 enters the third plasma arc heater 130 via feed 23. A stream of $CO_2$ that has been sequestered or captured from an energy intensive operation, such as a 1,000 MW power plant, is also introduced into the third plasma arc heater 130 via feed 22. The third plasma arc heater 130 subjects the $H_2$ and $CO_2$ gas mixture 3 to temperatures of 5,000° C. or greater. At these temperatures, the bonds between carbon, oxygen and hydrogen atoms are broken. The third plasma arc heater 130 is in connection with a $CO_2$ converter 140 via feed 25, wherein the mixture 3 of carbon, oxygen and $H_2$ atoms is fed into the $CO_2$ converter reactor 140. The $CO_2$ converter 140 combines the of carbon, oxygen and $H_2$ atoms to form a steam $H_2O$ stream and a graphite stream. The steam $H_2O$ stream and any unreacted hydrogen $H_2$ and unreacted $CO_2$ exit the $CO_2$ converter reactor 140 and enter the second stage mixer 80 via feed 29. The graphite stream exits the system as an output at outlet feed 28. Again, conventional chemical separation methods can be used to separate the graphite molecules from the $H_2$/steam $H_2O$ stream.

The $CO_2$ converter 140 is in connection with a second stage mixer 80 via feed 29. The second stage mixer 80 is in connection with a second steam generator 90 via feed 30. The second stage steam generator 90 is in connection with a second stage steam turbine 100 via feed 114. The second stage steam turbine 100 is in connection with a second stage steam condenser 117 via feed 116. The second stage steam condenser 117 is in connection with the second stage steam generator 90 via a feedback feed 118. The second stage steam turbine 100 is also in connection with a second stage generator 120 via feed 119. The second stage generator 120 is in electrical connection with the third plasma arc heater 130 to supply electrical power thereto via connection 121. This electrical power can supplement electrical power being supplied to the third plasma arc heater 140 via an electrical power grid or external electrical power source 122. The second stage steam generator 90 is also in connection with a water separator 40 via feed 31. The water separator 40 separates unreacted hydrogen $H_2$ and unreacted $CO_2$ from steam generated in the $CO_2$ converter reactor 140. The water exits the water separator 40 at outlet 41. The unreacted hydrogen $H_2$ and unreacted $CO_2$ stream at 42 from the water separator 40 is split in to two streams. One stream of unreacted hydrogen $H_2$ and unreacted $CO_2$ at 44 is recycled to the third plasma arc heater 130 where it is reheated to be cracked along with the $CO_2$ feed at 22. The second stream of unreacted hydrogen $H_2$ and unreacted $CO_2$ at 43 has a connection to the second stage mixer 80.

It is contemplated for the $CO_2$ being introduced into the third plasma arc heater 130 via feed 22 to enter the third plasma arc heater 130 through a first port and be used generate plasma heat gas for the third plasma arc heater 130. The $H_2$ stream via feed 23 and the unreacted hydrogen $H_2$ and unreacted $CO_2$ via feed 22 introduced into the third plasma arc heater 130 enter the third plasma arc heater 130 through second and third ports, respectively, and are not used to generate plasma heat gas for the third plasma arc heater 130. Temperatures of 5,000° C. or greater are required to crack $H_2$ and $CO_2$, and thus it is contemplated for the temperature within the arc column to be within a range from 5,000° C. to 10,000° C. This will require the third plasma arc heater 130 to generate plasma gas within a range from 1,500° C. to 5,000° C. In a preferred embodiment, the third plasma arc heater 130 generates plasma gas within a range from 3,000° C. to 5,000° C.

An exemplary process for the second stage 900 is as follows. The $H_2$ stream generated from the hydrogen separator 7 of the first stage 800 enters the third plasma arc heater 130 via feed 23. A stream of $CO_2$ is also introduced into the third plasma arc heater 130 via feed 22. The stream of $H_2$ and $CO_2$ is subjected to a 5,000° C. environment via an arc column of the third plasma arc heater 130, wherein the bonds between carbon, oxygen, and hydrogen atoms are broken. The mixture of carbon, oxygen, and hydrogen atoms is fed into the $CO_2$ converter reactor 140 via feed 25, wherein graphite is removed from the $CO_2$ converter reactor 140 at feed 28. Hot gases comprising unreacted hydrogen $H_2$, unreacted $CO_2$ and $H_2O$ steam exit the $CO_2$ converter reactor 140 and enter the second stage mixer 80 via feed 29, wherein the stream of unreacted hydrogen $H_2$, unreacted $CO_2$ and $H_2O$ steam is quenched by recycled unreacted hydrogen $H_2$ and unreacted $CO_2$ fed into the mixer 80 via feed 43. The quenched unreacted hydrogen $H_2$ and quenched unreacted $CO_2$ and quenched $H_2O$ stream is fed into the second stage steam generator 90 (which may comprise a series of heat exchangers) to be further cooled, wherein the $H_2O$ steam condenses to water. The cooling of the quenched unreacted hydrogen $H_2$ and unreacted $CO_2$ and quenched $H_2O$ stream is used to generate electricity that is transmitted to the third plasma arc heater 130 via connection 121. The cooled unreacted hydrogen $H_2$, unreacted $CO_2$ and water $H_2O$ stream is fed into the water separator 40 via feed 31, wherein water is condensed and is separated out at 41. The concentrated stream of unreacted hydrogen $H_2$ and unreacted $CO_2$ is split into two streams. A first concentrated stream of unreacted hydrogen $H_2$ and unreacted $CO_2$ is recycled (directed to) to the third plasma arc heater 130 via feed 44 where it is reheated to be cracked along with $CO_2$ being introduced via feed 22. The second stream of unreacted hydrogen $H_2$ and unreacted $CO_2$ is directed via feed 43 into the second stage mixer 80 to quench the hot gas stream entering the second stage mixer 80.

The system described and illustrated herein has two plasma arc heaters 2, 11 in the first stage 800 and one plasma arc heater 130 in the second stage 900. The plasma arc heaters are used to crack streams of gas flowing through the system, the cracked gas then being supplied to the pyrolysis reactor 4 or $CO_2$ converter 140. It is understood that any number of plasma arc heaters can be used to crack gas streams to meet desired design criteria. For instance, it may be desirable to use more than two or less than two plasma arc heaters in the first stage 800 to obtain a desired operating efficiency for the system.

FIG. 3 illustrates an exemplary system 1000 in which an embodiment of the invention can be applied. An embodiment of the inventive system is referred to as a plant 100 and is placed in connection with a power plant that generates $CO_2$ emissions. $CO_2$ emissions from the power plant are sequestered and fed into the plant 100 via feed 200—e.g., this gas is fed into the third plasma arc heater 130 of the second stage 900. $CH_4$ is fed into the plant 100 via feed 300—e.g., this gas is fed into the primary plasma arc heater 2 of the first stage 800. Electrical power is provided to various components (e.g., plasma arc heaters 2, 11, 130) of the plant 100 via line 400. The plant 100 is operated in accordance with the process steps described herein to generate a graphite stream 500 and a water stream 600. The graphite stream 500 comprises the graphite exiting the first stage 800 at outlet 32 and the graphite exiting the second stage 900 at outlet 28. The water stream 600 comprises the water exiting the second stage 900 at outlet 41.

It is therefore seen that systems and processes in accordance with the present invention can make use of known and available components, such as plasma arc heaters 2, 11, 130 for converting carbon dioxide in to graphite and water by utilizing hydrogen generated from natural gas, in particular innovative ways to minimize greenhouse gas, with insight as to both the capital cost and the operating cost. A need for such cost-effective treatment of carbon dioxide has been heightened by climate change that has been caused by temperature rise of Earth's atmosphere.

Figure 4:
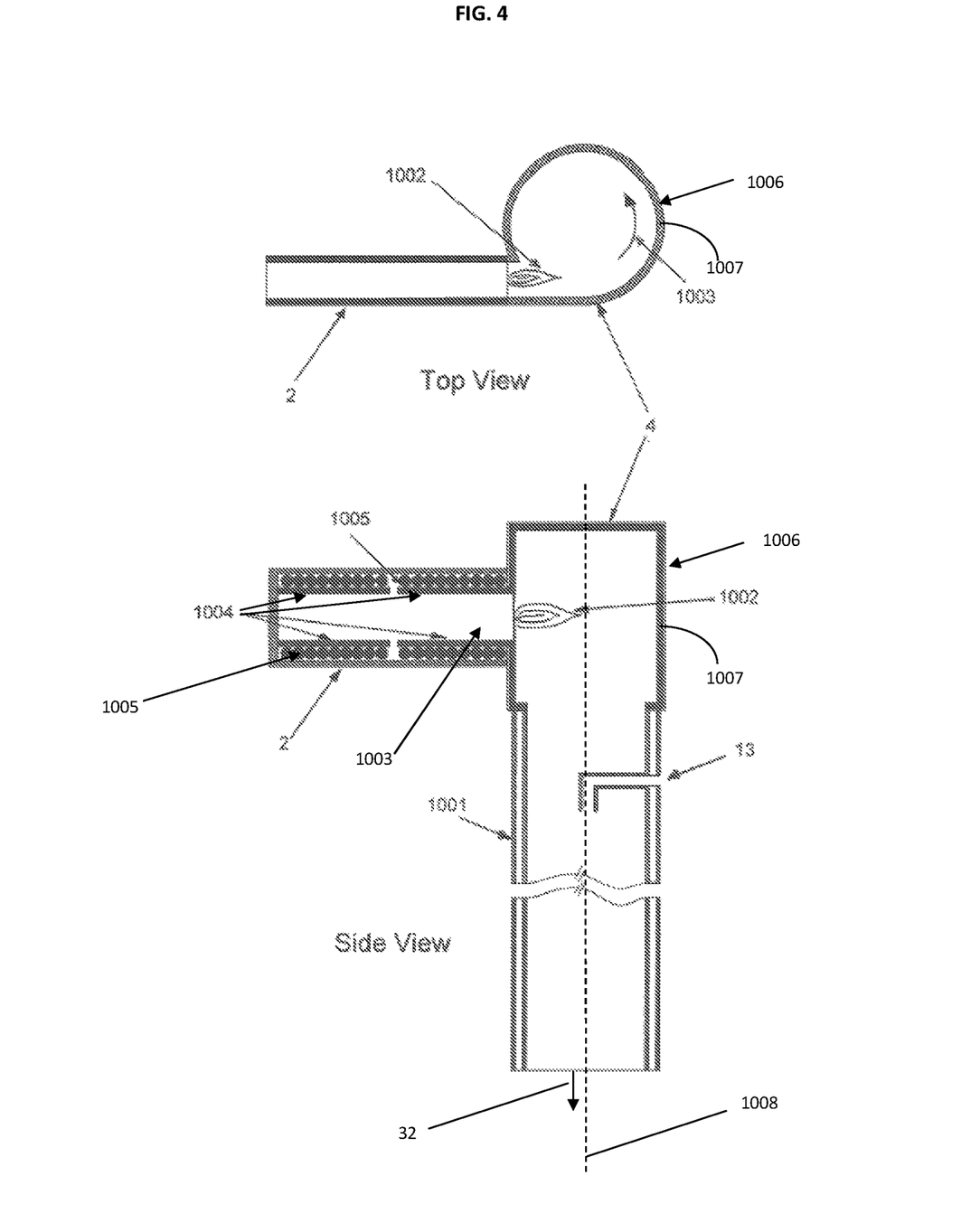
FIG. 4 shows an exemplary system configuration in which an embodiment of a pyrolysis reactor is connection with an embodiment of a plasma arc heater.

Referring to FIG. 4, an exemplary embodiment of the pyrolysis reactor 4 in connection with the first stage plasma arc heater 2 is shown. The plasma arc heater 2 includes an arc column space 1003 created by electrodes 1004 (e.g., tubular electrodes) with coils 1005 (e.g., electric coils) disposed around the electrodes 1004. For instance, there can be two tubular electrodes 1004 arranged adjacent each other so that a central portion of each tubular electrode 1004 forms the arc column space 1003. More or less electrodes 1004 can be used. In the plasma arc heater 2, the plasma gas is introduced between two tubular electrodes 1004 (i.e., within the arc column space 1003) such that an arc column (a plasma formation in a region of space in which ions can pass from one pole to another pole) is generated. The arc column is rotated at high angular speed by magnetic flux produced by the electric current flowing through the coils 1005 surrounding the tubular electrodes 1004. This produces uniform ultra-high temperature inside the plasma arc heater 2, wherein the plasma gas is completely dissociated in to its atomic species. The pyrolysis reactor 4 includes a reactor vessel 1006 having a wall(s) 1007 and a central axis 1008. The wall(s) 1007 is/are configured to have coolant flowing through passages 1001 (e.g., annular passages) located on surface (e.g., an outer surface) of the wall(s) 1007. The pyrolysis reactor 4 is configured to receive the stream 1002 of C and H atoms from the plasma arc heater 2 through an inlet designed to introduce the C and H atoms in a tangential flow direction 1003 to the central axis 1008 of the pyrolysis reactor 4, which push the C atoms towards the wall(s) 1007 of the pyrolysis reactor 4 away from the H atoms, such that solid graphite is generated instead of carbon black along the wall(s) 1007 from C atoms and $H_2$ gas is generated from H atoms along a center 1008. This occurs via $CH_4$ pyrolysis reaction: $CH_4 \rightarrow C + 2H_2$. The graphite exits the pyrolysis reactor 4 via an outlet 32 and $H_2$ gas exits via outlet 13.

Figure 5:
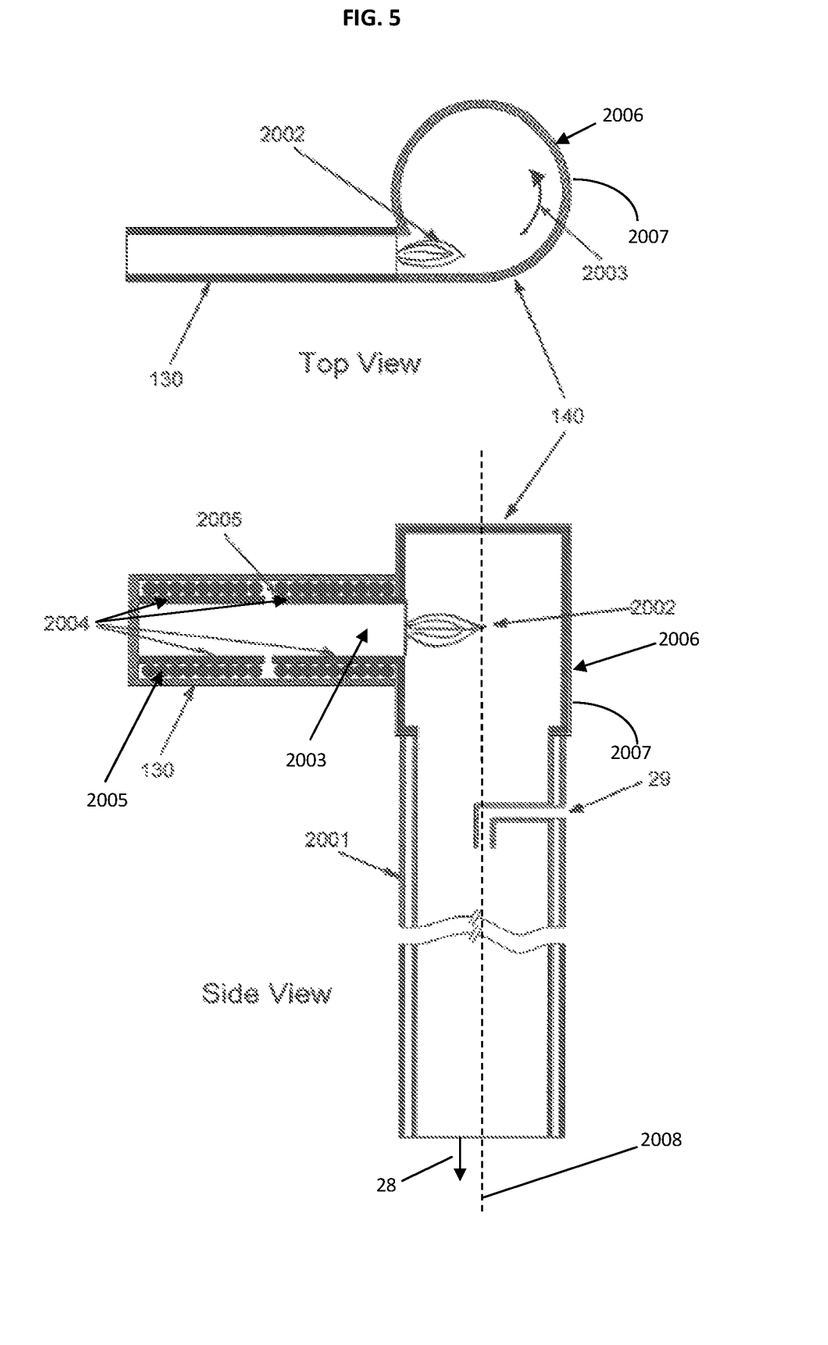
FIG. 5 shows an exemplary system configuration in which an embodiment of a $CO_2$ converter reactor is in connection with an embodiment of a plasma arc heater.

Referring to FIG. 5, an exemplary embodiment of the $CO_2$ converter reactor 140 in connection with the plasma arc heater 130 is shown. The plasma arc heater 130 includes an arc column space 2003 created by electrodes 2004 (e.g., tubular electrodes) with coils 2005 (e.g., electric coils) disposed around the electrodes 2004. For instance, there can be two tubular electrodes 2004 arranged adjacent each other so that a central portion of each tubular electrode 2004 forms the arc column space 2003. More or less electrodes 2004 can be used. In the plasma arc heater 130, the plasma gas is introduced between the two tubular electrodes 2004 (i.e., within the arc column space 2003) such that an arc column (a plasma formation in a region of space in which ions can pass from one pole to another pole) is generated. The arc column is rotated at high angular speed by magnetic flux produced by the electric current flowing through the coils 2005 surrounding the tubular electrodes 2004. This produces uniform ultra-high temperature inside the plasma arc heater 130, wherein the plasma gas is completely dissociated in to its atomic species. $CO_2$ converter reactor 140 includes a reactor vessel 2006 having a wall(s) 2007 and a central axis 2008. The wall(s) 2007 is/are configured to have coolant flowing through passages 2001 (e.g., annular passages) located on a surface (e.g., an outer surface) of the wall(s) 2007. The $CO_2$ converter reactor 140 is configured to receive the C, O, and H atoms from the plasma arc heater 130 through an inlet designed to introduce the C, O, and H atoms in a tangential flow direction 2003 to the central axis 2008 of the $CO_2$ converter reactor 140, which push the C atoms towards the wall(s) 2007 of the $CO_2$ converter reactor 140 away from the O and H atoms, such that solid graphite is generated instead of carbon black along the wall(s) 2007 from C atoms and $H_2O$ gas is generated from H atoms and O atoms along a center 2008 due to preferential affinity O atoms to H atoms over C atoms in the graphite to generate a graphite stream and an $H_2O$ stream. This occurs via $CO_2$ reduction reaction: $CO_2 + 2H_2 \rightarrow C + 2H_2O$. The graphite exits the $CO_2$ converter reactor 140 via an outlet 28 and $H_2O$ steam via outlet 29.

In general summary, but without limitation, the present invention can be characterized in the following ways, for example:

A system, and a corresponding method, in which carbon dioxide is converted to graphite and water in a reactor which is supplied with hydrogen produced from natural gas. The system additionally has heat recovery feature such that the energy requirement of the system is optimized. The heat recovery system produces high pressure steam which is utilized in a turbine generator system to produce electricity which reduces the amount of total electricity required from the grid. The system additionally has resource recovery features such that conversion of carbon dioxide results in production of graphite, an industrially widely used resource and water, a scare resource in most regions of world. Also, or alternatively, such a system may be used to generate hydrogen for general use in the world economy.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

What is claimed is:

1. A system for removal of carbon from carbon dioxide, the system comprising:
   a first stage, the first stage comprising:
   a first stage primary plasma arc heater configured to receive $CH_4$ from a $CH_4$ source, the first stage primary plasma arc heater having an arc column that subjects the $CH_4$ to a temperature that breaks bonds between carbon and hydrogen to generate C atoms and H atoms;
   a first stage pyrolysis reactor configured to receive the C and H atoms from the first stage plasma arc heater through an inlet designed to introduce the C and H atoms in a tangential flow direction to an axis of the pyrolysis reactor, which push the C atoms towards a wall of the first stage pyrolysis reactor away from H atoms, such that solid graphite is generated instead of carbon black along the wall of the first stage pyrolysis reactor from C atoms and $H_2$ gas is generated from H atoms along a center portion of the first stage pyrolysis reactor via $CH_4$ pyrolysis reaction $CH_4 \rightarrow C + 2H_2$, wherein the wall of the first stage pyrolysis reactor is cooled by coolant flowing through an annular passage on an outside of the wall;
   a first stage quench mixer configured to receive the $H_2$ and the unreacted $CH_4$ at a temperature t1 from the first stage pyrolysis reactor and receive a concentrated stream of heavier weight hydrocarbons at a temperature t2 from a first stage hydrogen separator, wherein: t2<t1; and
   the first stage quench mixer has a mix chamber to mix the $H_2$, the unreacted $CH_4$, and the concentrated stream of heavier weight hydrocarbons and to allow the concentrated stream of heavier weight hydrocarbons to quench the $H_2$ and the unreacted $CH_4$ and form a quenched outlet gas stream comprising a mixture of $H_2$, unreacted $CH_4$, and recycled heavier weight hydrocarbons;
   a first stage steam generator configured to receive the quenched outlet gas stream from the first stage quench mixer and generate an outlet gas stream and steam, the steam being fed to a steam turbine-generator to produce electricity, the electricity being transmitted to the first stage primary plasma arc heater; and
   the first stage hydrogen separator configured to receive the outlet gas stream from the first stage steam generator and generate a concentrated stream of $H_2$ and the concentrated stream of heavier weight hydrocarbons; and
   a second stage, comprising:
   a second stage plasma arc heater configured to receive the concentrated stream of $H_2$ from the first stage hydrogen separator, heavier weight hydrocarbons from a water separator, and $CO_2$ from a $CO_2$ source, the second stage primary plasma arc heater having an arc column that subjects the $H_2$, the heavier weight hydrocarbons, and the $CO_2$ to a temperature that breaks bonds between carbon, hydrogen, and oxygen to generate C, O, and H atoms; and
   a second stage $CO_2$ converter reactor configured to receive the C, O, and H atoms from the second stage plasma arc heater through an inlet designed to introduce the C, O, and H atoms in a tangential flow direction to an axis of the $CO_2$ converter reactor, which push the C atoms towards the wall of the $CO_2$ converter reactor away from the O and H atoms, such that solid graphite is generated instead of carbon black along a wall of the $CO_2$ converter reactor from C atoms and $H_2O$ gas is generated from H atoms and O atoms along a center of the $CO_2$ converter reactor due to preferential affinity O atoms to H atoms over C atoms in the graphite to generate a graphite stream and an $H_2O$ stream via $CO_2$ reduction reaction $CO_2 + 2H_2 \rightarrow C + 2H_2O$, wherein the wall of the $CO_2$ converter reactor is cooled by coolant flowing through an annular passages on an outside of the wall.

2. The system of claim 1, wherein the first stage plasma arc heater is configured to generate plasma gas within a range from 1,500° C. to 5,000° C. so as to subject the $CH_4$ to temperatures within a range from 1,500° C. to 5,000° C.

3. The system of claim 1, wherein:
   the first stage hydrogen separator is configured to generate a concentrated stream of $CH_4$ in addition to the concentrated stream of heavier weight hydrocarbons;
   the first stage includes a first stage secondary plasma arc heater, and the system is configured to direct the concentrated stream of $CH_4$ to the first stage secondary plasma arc heater;
   the system is configured to direct at least a portion of the concentrated stream of heavier weight hydrocarbons to the first stage primary plasma arc heater.

4. The system of claim 3, wherein:
   the electricity generated by the first stage steam generator is also transmitted to the first stage secondary plasma arc heater.

5. The system of claim 3, wherein:
   the first stage secondary plasma arc heater is in connection with the first stage pyrolysis reactor; and
   the system is configured to direct C atoms and H atoms from the first stage secondary plasma arc heater to the first stage pyrolysis reactor.

6. The system of claim 1, further comprising:
   a second stage quench mixer configured to receive any unreacted $CO_2$ and any unreacted $H_2$ at a temperature t3 from the second stage $CO_2$ converter reactor, and receive heavier weight hydrocarbons at a temperature t4 from the water separator, wherein:

t4<t3; and the second stage quench mixing has a mix chamber to mix the unreacted $CO_2$, the unreacted hydrogen $H_2$, and the heavier weight hydrocarbons and to allow the heavier weight hydrocarbons to quench the unreacted $CO_2$ and the unreacted hydrogen $H_2$ to generate a quenched stream.

7. The system of claim 6, further comprising:

a second stage steam generator configured to receive the quenched stream from the second stage mixer, generate steam from the quenched stream, the steam being fed to a steam turbine-generator to produce electricity, the electricity being transmitted to the second stage plasma arc heater.

8. The system of claim 1, wherein the second stage plasma arc heater is configured to generate plasma gas within a range from 1,500° C. to 5,000° C. so as to subject the $H_2$, the heavier weight hydrocarbons, and the $CO_2$ to temperatures within a range from 1,500° C. to 5,000° C.

9. The system of claim 1, wherein the first stage hydrogen separator is configured to generate a concentrated stream of acetylene in addition to the concentrated stream of $H_2$ and the concentrated stream of heavier weight hydrocarbons.

10. A system for removal of carbon from carbon dioxide, the system comprising:

a first stage, the first stage comprising:

a first stage primary plasma arc heater configured to receive $C_xH_y$ from a $C_xH_y$ source, the first stage primary plasma arc heater having an arc column that subjects the $C_xH_y$ to a temperature that breaks bonds between carbon and hydrogen to generate C atoms and H atoms;

a first stage pyrolysis reactor configured to receive the C and H atoms from the first stage plasma arc heater through an inlet designed to introduce the C and H atoms in a tangential flow direction to an axis of the pyrolysis reactor, which push the C atoms towards a wall of the pyrolysis reactor away from H atoms, such that solid graphite is generated instead of carbon black along the wall of the first stage pyrolysis reactor from C atoms and $H_2$ gas is generated from H atoms along a center portion of the first stage pyrolysis reactor via $C_xH_y$ pyrolysis reaction $C_xH_y \rightarrow xC+y/2H_2$, wherein the wall of the pyrolysis reactor is cooled by coolant flowing through an annular passage on an outside of the wall;

a first stage quench mixer configured to receive the $H_2$ and the unreacted $C_xH_y$ at a temperature t1 from the first stage pyrolysis reactor and receive a concentrated stream of heavier weight hydrocarbons at a temperature t2 from a first stage hydrogen separator, wherein:

t2<t1; and the first stage quench mixer has a mix chamber to mix the $H_2$, the unreacted $C_xH_y$, and the concentrated stream of heavier weight hydrocarbons and to allow the concentrated stream of heavier weight hydrocarbons to quench the $H_2$ and the unreacted $C_xH_y$ and form a quenched outlet gas stream comprising a mixture of $H_2$, unreacted $C_xH_y$, and recycled heavier weight hydrocarbons;

a first stage steam generator configured to receive the quenched outlet gas stream from the first stage quench mixer and generate an outlet gas stream and steam, the steam being fed to a steam turbine-generator to produce electricity, the electricity being transmitted to the first stage primary plasma arc heater; and the first stage hydrogen separator configured to receive the outlet gas stream from the first stage steam generator and generate a concentrated stream of $H_2$ and the concentrated stream of heavier weight hydrocarbons; and a second stage, comprising:

a second stage plasma arc heater configured to receive the concentrated stream of $H_2$ from the first stage hydrogen separator, heavier weight hydrocarbons from a water separator, and $CO_2$ from a $CO_2$ source, the second stage primary plasma arc heater having an arc column that subjects the $H_2$, the heavier weight hydrocarbons, and the $CO_2$ to a temperature that breaks bonds between carbon, hydrogen, and oxygen to generate C, O, and H atoms; and a second stage $CO_2$ converter reactor configured to receive the C, O, and H atoms from the second stage plasma arc heater through an inlet designed to introduce the C, O, and H atoms in a tangential flow direction to an axis of the $CO_2$ converter reactor, which push the C atoms towards a wall of the $CO_2$ converter reactor away from the O and H atoms, such that solid graphite is generated instead of carbon black along the wall of the $CO_2$ converter reactor from C atoms and $H_2O$ gas is generated from H atoms and O atoms along a center of the $CO_2$ converter reactor due to preferential affinity O atoms to H atoms over C atoms in the graphite to generate a graphite stream and an $H_2O$ stream via $CO_2$ reduction reaction $CO_2+2H_2 \rightarrow C+ 2H_2O$, wherein the wall of the $CO_2$ converter reactor is cooled by coolant flowing through an annular passages on an outside of the wall;

wherein in the hydrocarbon $C_xH_y$:

x is an integer 1, 2, 3, . . . , and y=2x+2.

11. The system of claim 10, wherein the first stage plasma arc heater is configured to generate plasma gas within a range from 1,500° C. to 5,000° C. so as to subject the $C_xH_y$ to temperatures within a range from 1,500° C. to 5,000° C.

12. The system of claim 10, wherein:

the first stage hydrogen separator is configured to generate a concentrated stream of $C_xH_y$ in addition to the concentrated stream of heavier weight hydrocarbons;

the first stage includes a first stage secondary plasma arc heater, and the system is configured to direct the concentrated stream of $C_xH_y$ to the first stage secondary plasma arc heater;

the system is configured to direct at least a portion of the concentrated stream of heavier weight hydrocarbons to the first stage plasma arc heater.

13. The system of claim 12, wherein:

the electricity generated by the first stage steam generator is also transmitted to the first stage secondary plasma arc heater.

14. The system of claim 12, wherein:

the first stage secondary plasma arc heater is in connection with the first stage pyrolysis reactor; and the system is configured to direct C atoms and H atoms from the first stage secondary plasma arc heater to the first stage pyrolysis reactor.

15. The system of claim 10, further comprising:

a second stage quench mixer configured to receive any unreacted $CO_2$ and any unreacted $H_2$ at a temperature t3 from the second stage $CO_2$ converter reactor, and receive heavier weight hydrocarbons at a temperature t4 from the water separator, wherein:

t4<t3; and the second stage quench mixer has a mix chamber to mix the unreacted $CO_2$, the unreacted hydrogen $H_2$, and the heavier weight hydrocarbons and to allow the heavier weight hydrocarbons to quench the unreacted $CO_2$ and the unreacted hydrogen $H_2$ to generate a quenched stream.

16. The system of claim 15, further comprising:

a second stage generator configured to receive the quenched stream from the second stage mixer, generate steam from the quenched stream, the steam being fed to a steam turbine-generator to produce electricity, the electricity being transmitted to the second stage plasma arc heater.

17. The system of claim 10, wherein the second stage plasma arc heater is configured to generate plasma gas within a range from 1,500° C. to 5,000° C. so as to subject the $H_2$, the heavier weight hydrocarbons, and the $CO_2$ to temperatures within a range from 1,500° C. to 5,000° C.

18. The system of claim 10, wherein the first stage hydrogen separator is configured to generate a concentrated stream of acetylene in addition to the concentrated stream of $H_2$ and the concentrated stream of heavier weight hydrocarbons.

19. A method for removal of carbon from carbon dioxide, the method comprising:

generating C atoms and H atoms from $CH_4$;

generating graphite and $H_2$ from the C atoms and H atoms, and extracting the graphite;

mixing the $H_2$ with $CH_4$ and hydrocarbons having a heavier weight relative to the $CH_4$ compound;

receiving, at a generator, the mixed $H_2$, $CH_4$ and heavier weight hydrocarbons and generating electricity;

generating a concentrated stream of $H_2$ from the mixed $H_2$, $CH_4$ and heavier weight hydrocarbons;

receiving $CO_2$ and the concentrated stream of $H_2$ and generating C, O, and H atoms; and receiving the C, O, and H atoms and generating graphite, wherein the graphite is extracted.

20. A method for removal of carbon from carbon dioxide, the method comprising:

generating C atoms and H atoms from $C_xH_y$;

generating graphite and $H_2$ from the C atoms and H atoms, and extracting the graphite;

mixing the $H_2$ with $C_xH_y$ and hydrocarbons having a heavier weight relative to the $C_xH_y$ compound;

receiving, at a generator, the mixed $H_2$, $C_xH_y$ and heavier weight hydrocarbons and generating electricity;

generating a concentrated stream of $H_2$ from the mixed $H_2$, $C_xH_y$ and heavier weight hydrocarbons;

receiving $CO_2$ and the concentrated stream of $H_2$ and generating C, O, and H atoms; and receiving the C, O, and H atoms and generating graphite, wherein the graphite is extracted, wherein in the hydrocarbon $C_xH_y$:

x is an integer 1, 2, 3, . . . , and y=2x+2.

* * * * *